(12) United States Patent
Strelnikov et al.

(10) Patent No.: US 11,564,146 B2
(45) Date of Patent: Jan. 24, 2023

(54) METHOD FOR ORGANIZING A DATA TRANSMISSION NETWORK

(71) Applicant: DIS PLUS, Moscow (RU)

(72) Inventors: Mikhail Viktorovich Strelnikov, Khimki (RU); Sergey Vasilievich Malashikhin, Moscow (RU); Yuri Borisovich Sokolov, Fryazino (RU)

(73) Assignee: Yuri Borisovich Sokolov

( * ) Notice: Subject to any disclaimer, the term of this patent is extended or adjusted under 35 U.S.C. 154(b) by 0 days.

(21) Appl. No.: 17/265,031

(22) PCT Filed: Oct. 4, 2019

(86) PCT No.: PCT/RU2019/000708
§ 371 (c)(1),
(2) Date: Feb. 1, 2021

(87) PCT Pub. No.: WO2020/180206
PCT Pub. Date: Sep. 10, 2020

(65) Prior Publication Data
US 2021/0314844 A1 Oct. 7, 2021

(30) Foreign Application Priority Data
Mar. 4, 2019 (RU) .................................. 2019105942

(51) Int. Cl.
*H04W 40/22* (2009.01)
(52) U.S. Cl.
CPC .................................. *H04W 40/22* (2013.01)
(58) Field of Classification Search
None
See application file for complete search history.

(56) References Cited

U.S. PATENT DOCUMENTS 9,538,423 B2   1/2017   Alvarez et al.
9,729,444 B2   8/2017   Wells
(Continued)

FOREIGN PATENT DOCUMENTS

CN   101083624   12/2007

OTHER PUBLICATIONS

Bershadsky A.M. etv al. Obzor metodov marshrutizatsii v besprovodnykh sensomykh setiakh. Tekhnicheskie nauki, Informatika, vychislitelnaya tekhnika, N° 1 (21), 2012, p. 52.

*Primary Examiner* — Brian S Roberts
(74) *Attorney, Agent, or Firm* — Bryant J. Keller; Kirton McConkie

(57) ABSTRACT

A method for organizing a data transmission network relates to information technologies and is intended to create an information transmission network between two or more points at a distance. The technical result of the claimed solution is a simplification in structure and a reduction in build time and the cost of network usage. The method is built on a node indexing algorithm based on a minimum number of packet retransmissions from modem to node. The method allows the use of a plurality of optionally moveable modems in a network and the use of wired and wireless networks, does not require the presence of a powerful base station, does not require additional time for rebuilding a network when signal transmission conditions are changed or when the number of nodes in a network is changed, allows a network structure to be built and the built structure to be further optimized, and does not require the nodes to store information about the network environment, which substantially lowers the cost of the solution.

8 Claims, 1 Drawing Sheet

(56) References Cited

U.S. PATENT DOCUMENTS

| | | | |
|---|---|---|---|
| 9,788,257 B2* | 10/2017 | Singh | H04W 40/246 |
| 9,794,771 B2 | 10/2017 | Raveendran | |
| 2004/0174844 A1* | 9/2004 | Cho | H04L 12/1868 |
| | | | 370/328 |
| 2015/0124606 A1* | 5/2015 | Alvarez | H04W 28/085 |
| | | | 370/235 |
| 2017/0238245 A1 | 8/2017 | Mathai et al. | |
| 2019/0215753 A1* | 7/2019 | Sathya | H04W 40/10 |
| 2019/0335525 A1* | 10/2019 | Liu | H04W 76/20 |
| 2020/0092203 A1* | 3/2020 | di Marco | H04L 69/22 |

* cited by examiner

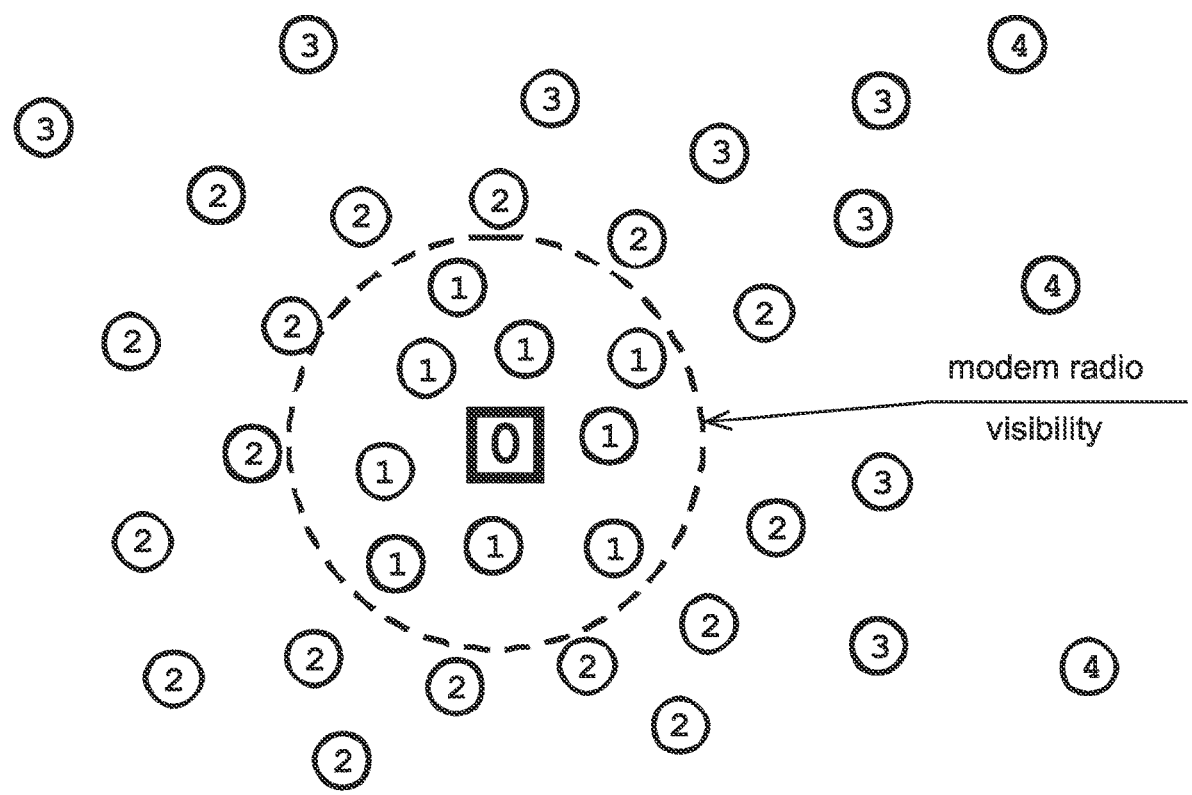

METHOD FOR ORGANIZING A DATA TRANSMISSION NETWORK

PERTINENT ART

This claimed invention relates to information technologies and is intended for creating a data network between two or more distantly located points.

PRIOR KNOWLEDGE

There is the known Global System for digital mobile communications (GSM) that uses a combination of Time Division Multiple Access (TDMA) and Frequency Division Multiple Access (FDMA) wherein the technologies like General Packet Radio Service (GPRS) or High Speed Circuit Switched Data (HSCSD) are applied.

There is the known Narrow Narrow Band Internet. of Things (NB-IoT)—the mobile communications standard applicable for low-volume data telemetry equipment intended for docking to digital networks of a wide range of stand-alone devices; it is featured with a large network capacity and can be deployed either on cellular network equipment or individually including GSM off-line facilities.

There is the known LoRa wireless network intended for exchanging data over license-free sub-GHz RF bands; it can provide power-saving data transmission over long-distance networks. LoRaWAN networking architecture is deployed in a star topology in which end nodes transmit messages to a central network operator server over gateways that make up transparent bridges. Subscribers can transmit data to such end nodes over transparent bidirectional and secure transmission channels.

LoRaWAN protocol is a network low-cost Internet protocol used for transmitting data over great distances and it is applied in mining industry, in natural resource and power regeneration management sectors, in transcontinental logistics and in consignment.

There is known wireless networks 6LoWPAN (IPv6 over Low power Wireless Personal Area Networks)—IPv6 protocol for exchanging data over low-capacity wireless personal networks. 6LoWPAN gives priority to applications installed on power- and capacity-limited devices that operate over low-speed wireless networks—e.g. applicable in domestic, office and factory automation systems.

As opposed to "Star" configuration, the proposed solution does not require using any powerful base stations.

As opposed to "Mesh" configuration, the network concerned (WA) does not require additional time for reconstructing any network when changing signal pass conditions or changing number of nodes within a network making it possible to initialize a network structure and optimize it thereafter, thus gaining significant benefits: i.e. costs be reduced and no excess time can be taken for deploying a network with no need to save any information by network nodes.

The technical result of the claimed solution is simplifying the structure, saving networking time and costs.

ESSENCE OF THE INVENTION

Definition of terms used in the below description:

a modem means a network controller unit (this device is used for creating a communication physical-based environment with propagation medium), a node means a network element (unit), a packet means any network transmission data, packet information means a set of data stored in a packet for transmission by network elements without any changes. Data encryption is not considered as data change, a packet header means ordering information used for transmitting data; it can be changed, supplemented with network elements, a network identifier means a number that designates assignment of a modem and node to a particular network, packet relaying means a process of receiving data subsequently transmitted safe in packets, a network element identifier means a number, a character string or another set of data, for example, MAC address identifying a unique product code. No network elements having a similar identifier can be used within one network, a modem or a node number means a number, a character string or another set of data used within a network and assigned during networking. A modem number cannot be changed during networking, direction of packet transmission means a number, a character string or another set of data that specify directions of data transmission from a modem to a node, to a group of nodes, or from a node to a modem, an accepted packet means a packet accepted by a network element, provided that it contains integral information and a header, a packet initiator means a network element that initiates transmission of a packet. A network element relaying a packet is not an initiator, a packet signature means a number, a character sting or another set of data being a part of a packet header and generated by a packet initiator, packet network lifetime means maximum time taken by nodes in a network for relaying a packet depending on number of nodes in a network and information rate. It is selected on an individual basis.

The data networking technique is featured with a node numbering algorithm based on a minimum number of packets relayed from a modem to a node and includes numbering of nodes with minimum visible number+1 assigned to packets when transmitting any packet from a group modem to several or all nodes or from an address modem to any node. Nodes may be numbered as repeated, assigned ones under any law, provided that such numbering follows the above-mentioned approach, wherein packet transmission direction is specified as that from a modem to nodes or from nodes to a modem. When transmitting a packet from a modem to nodes, the packet is relayed by a node with number of relays from modem m, with number of relays m−1 from nodes only; when transmitting a packet from nodes to a modem, the packet is relayed by a node with number of relays from modem m, with number of relays M+1 from a node only. A modem has its constant value of number of relays equal to zero (m=0). Every packet has a signature that remains constant while relaying in the network and used for preventing any events of relaying a packet repeatedly by a node. Packets having a similar signature are relayed by a node once. A node stores a packet signature keeping it in its memory throughput the packet network life, i.e. maximum time taken by the rest nodes in the network for relaying a packet; on expiration of time a signature fails but can be reused again.

Layout of the network is shown in FIG. 1.

DETAILED DESCRIPTION OF THE METHOD

Let's consider relevance of any other network technique by giving an example of current wireless networks. The data networking method is described below.

The following set of ordering information is transmitted for networking: a network identifier, a network element identifier, a modem or a node number, packet transmission direction, packet signature.

Such networking is based on a node numbering principle with number of packets relayed from a modem to a node minimized.

Nodes are numbered while transmitting a packet from a group modem to several or all nodes or from an address modem to any node. Nodes may be numbered as repeated, assigned ones under any law, provided that such numbering follows the above-mentioned approach.

Numbering of nodes, i.e. assignment of a node with number N (m), is performed with reference to number of packet relays (m) from a modem to a node.

Number of relays for a modem is accepted as that to be equal to zero.

1.1. The networking process is initiated when a modem starts transmitting a packet. Any node that has accepted a packet from a modem, number of relays (m), assigns node number N(m+1) that corresponds to number of relays being equal to one N(m=1) or one more than a number of the modem having m equal to 0. If this node is not an end recipient of a packet, it relay a packet substituting a network element identifier for own identifier, a modem number for taken-up node number N(m=1) provided that the packet with a similar signature has not been relayed previously. Packets with a similar signature are relayed by a node once. The node stores a packet signature keeping it in its memory throughput the packet network life, i.e. maximum time taken by the rest nodes in the network for relaying a packet; on expiration of time a signature fails but can be reused again.

Consequently, all the nodes that accept a packet from the modem take up numbers N (m=1) that correspond to number of relays (m) being equal to one. Subsequently, the networking process goes on similarly. Any node accepting a packet from the node identified with number Nm that corresponds to number of relays (m) takes up number N(m+1) that corresponds to number of relays (m+1). If a node accepts packets from several nodes identified with numbers [N(x), N(y), N(z), . . . ], it takes up number of the node which number is one more than a minimum number (x, y, z, . . . ). As a result, nodes take up numbers that correspond to a minimum number of packets relayed from a modem to a node plus one.

1.2. Transmission of Packets in a Network from a Modem to Nodes.

If a modem is a packet initiator, the packet transmission process is directed from a modem to nodes. Packet is relayed in a network as follows:

An N(m)-assigned node, provided that it is not an end recipient of the packet and such packet with a similar signature has not been relayed previously, relays only those packets that have been received from the N(m−1)-assigned network elements substituting the network element identifier for own network element number N(m).

1.3. Transmission of Packets in a Network from a Node to a Modem.

If a node is a packet initiator, the packet transmission process is directed from a node to a modem. Packet is relayed in a network as follows:

An N(m)-assigned node, provided that a packet with a similar signature has not been relayed previously, relays only those packets that have been received from the N(m+1)-assigned network elements substituting the network element identifier for own network element number N(m).

A modem does not relay packets.

If a node is a packet initiator, it is a modem only can be an end recipient of the packet.

1.4. Receiving Networking Information

For receiving networking information, a packet transmission process can be initiated by a modem that gives a command to all nodes to provide the information of their own. The packet is transmitted from a modem to nodes according to Section 1.2

On receiving a packet with a command to provide the information of its own, a node initiates transmission of the packet from the node to the modem. A network element identifier of the node is transmitted in the packet containing ordering information.

On receiving packets from all the nodes, the modem receives the packets containing all network element identifiers and information about all network elements, respectively.

A packet header contains a network identifier, network element identifier, modem or node number, packet transmission direction, packet signature, and it is not limited by a set of the above data but comprises other ordering information necessary for network operation.

EXEMPLARY EMBODIMENT

Let's all modems in our network are identified with number 0. The node will be identified with a numerical number matching the least number of modem-to-node (Nm=m) relays 2.1 Example of Wireless Networking The only fixed number in a network is owned by a modem; our network number=0.

The modem initiates a packet transmission process (for example, packet TEST). As for a packet identifier, the modem will use own fixed number 0, packet direction 0 (modem to nodes), network identifier, for example, "12345", and package signature "2222".

All the nodes that have accepted a packet from the modem (packet identifier=0) with a network identifier matching their identifier "12345" take up number N=m=1 and relay, a packet with their number N=1 while keeping packet signature "2222", network identifier "12345", and direction 0 (modem to nodes) unchanged.

All the nodes that have accepted a packet from other nodes with a number=1 and direction 0 (modem to nodes) take up number N=m=2 and relay a packet identified with own number N=2 and direction 0.

The main principle of node numbering assignment can be interpreted as follows: let's assume that a node accepts packets from nodes 3, 4, . . . 10; the node takes up a number one more than the minimum number specified in the accepted packets. In this case, it will take up number N=4 and will relay a packet identified with number N=4.

The node initiates relaying a packet with a similar signature once upon taking up a number. The node stores signatures of the relayed packets keeping them in its memory for a certain period and always relays packets with one signature once only.

Consequently, one packet transmitted from a modem is enough for networking.

2.2 Receiving Networking Information

For receiving networking information, a modem transmits a packet that gives a command to provide all nodes with the information of its one (in this it is short package LIST). Nodes relay a packet received from the modem according to the procedure set out above. On receiving a packet containing the command concerned, the node transmits the packet with its own number, with a unique identifier (random number), with its MAC-address, with a set of its data (for example, communication quality, telemetry, geocoordinates, time etc.), and with direction 1 (node to modem). The packet relayed with the reverse direction is identified by number 1 (node to modem). If a node is identified with number N, it relays a package from nodes identified with numbers N+1 only including direction 1 (node to modem). Packets having one identification number are relayed once.

Consequently, the modem receives information about all the nodes available in the network.

2.3 Data Network Transmission

Network data are transmitted from a modem to nodes as specified in 2.1 and from nodes to a modem as specified in 2.2.

The networking method has a number of benefits if compared to the current solutions:

- opportunity to use multiple modems supporting the network reconfigurable after transmitting every packet from a modem to a node; information is delivered to the network regardless current network location of a modem.
- modem and node mobility.
- physical data transmission environment, for example, wiring and wireless networks, can be featured with signaling variability.
- as compared to a "star" configuration, no power base station is required.
- as compared to a "mesh" configuration, no additional time is to be taken for rebuilding a network in the events of variation of signal passage conditions and number of network nodes.
- as compared to a "mesh" configuration for initial networking optimization, the first thing is to build a network structure and the second one to optimize the ready-made structure, thereby saving networking time.
- as compared to a "mesh" configuration, there is no need to store any information in the network nodes, thus reducing the cost of the solution.

The invention claimed is:

1. A data networking method with a node numbering algorithm based on a minimum number of packets relayed from a modem m to a node, the method including:
   numbering each of a plurality of nodes with a minimum visible number+1;
   assigning the numbering to packets when transmitting any packet from a group modem to multiple or all nodes of the plurality of nodes or from an address modem to any node of the plurality of nodes;
   transmitting a packet from the modem m to the plurality of nodes such that the packet is relayed by a first node with a number of relays from the modem m, with a number of relays m−1 from nodes only; and
   transmitting the packet from the plurality of nodes to the modem m such that the packet is relayed by a second node with the number of relays from the modem m, with the number of relays M+1 from nodes only,
   wherein every packet has a signature that remains constant while relaying during a packet network lifetime and that is configured to be used to prevent a relaying of a specific packet repeatedly by a specific node.

2. A method for organizing a data transmission network, including:
   forming a data packet;
   transmitting the data packet in the data transmission network;
   receiving the data packet with at least one receiving node;
   retransmitting, via the at least one receiving node, the data packet in a direction of an initiator of the data packet,
   wherein the method includes a node numbering algorithm, based on a minimum number of packet retransmissions from a modem to the at least one receiving node,
   wherein the data packet is formed with a network lifetime and includes: a network identifier, a network element identifier, a modem number or node number, a packet transmission direction, and a packet signature,
   wherein any of the at least one receiving node that is a recipient of the data packet assigns itself a number N (m+1), where m is the modem number,
   wherein any of the at least one receiving node that is not a final recipient of the data packet retransmits the data packet by changing the network element identifier to its own number,
   wherein data packet relaying from the modem is performed only from nodes from the at least one receiving node with a number m−1,
   wherein when the data packet is transmitted from the at least one receiving node to the modem, the data packet is relayed by a node from the at least one receiving node with a number of retransmissions m+1, and
   wherein the data packet has the packet signature, which does not change during retransmission during the network lifetime of the data packet in the data transmission network.

3. The method of claim 2, wherein the data transmission network comprises a wired data transmission network.

4. The method of claim 2, wherein a numbering of nodes from the at least one receiving node is carried out when transmitting the data packet from the modem for at least one of: (i) all nodes, (ii) a group of nodes, and (iii) an address for one node.

5. A method of claim 2, wherein the initiator of the data packet comprises the modem.

6. A method of claim 2, wherein the initiator of the data packet comprises the at least one receiving node.

7. The method of claim 2, wherein the modem initiates the transmission of the data packet with a command to send information about itself to all nodes of the at least one receiving node to obtain information about a built network.

8. The method of claim 2, wherein the data transmission network comprises wireless data transmission network.

* * * * *